(12) United States Patent
Cousineau (10) Patent No.: US 7,095,597 B1
(45) Date of Patent: Aug. 22, 2006

(54) DISTRIBUTED STATIC VAR COMPENSATION (DSVC) SYSTEM FOR WIND AND WATER TURBINE APPLICATIONS

(75) Inventor: Kevin L. Cousineau, Lompoc, CA (US)

(73) Assignee: Clipper WindPower Technology, Inc., Carpenteria, CA (US)

( * ) Notice: Subject to any disclaimer, the term of this patent is extended or adjusted under 35 U.S.C. 154(b) by 451 days.

(21) Appl. No.: 10/426,287

(22) Filed: Apr. 30, 2003

(51) Int. Cl.
*H02H 7/06* (2006.01)

(52) U.S. Cl. .......................................... 361/20; 361/21
(58) Field of Classification Search ................. 361/20, 361/21
See application file for complete search history.

(56) References Cited

U.S. PATENT DOCUMENTS

| | | | | |
|---|---|---|---|---|
| 4,422,820 A | * | 12/1983 | Kirsch et al. ................. | 415/4.3 |
| 4,999,565 A | * | 3/1991 | Nilsson ....................... | 323/210 |
| 5,136,233 A | * | 8/1992 | Klinkenberg et al. ....... | 323/343 |
| 5,261,787 A | * | 11/1993 | Morgunov ................ | 415/208.1 |
| 6,753,792 B1 | * | 6/2004 | Beckwith ................ | 340/870.07 |
| 2004/0212353 A1 | * | 10/2004 | Nelson ........................ | 322/45 |

OTHER PUBLICATIONS

Shafer, D.A. et al., WindPACT Turbine Design Scaling Studies: Teachnical Area 4—Balance-of-Station Cost, published by National Renewable Energy Laboratory (NREL), Jul. 2001, Figure 9 and pp. A-1 through A-3.*

* cited by examiner

*Primary Examiner*—Robert L. Deberadinis
*Assistant Examiner*—Hal I. Kaplan
(74) *Attorney, Agent, or Firm*—Owen L. Lamb

(57) ABSTRACT

A power generating system wherein a variable speed turbine is mounted on top of a tower or tethered underwater. The reactive component of turbine generated electrical power is corrected automatically through electronic switched power-factor capacitor banks that are divided into sub-system modules coupled to a central turbine park sub-station. The sub-system modules are of a fixed size and are easily adaptable to different turbine generator types, sizes and groupings. By employing SCR switched power factor capacitors grouped in sub-system modules of fixed size, coupled to a central turbine park sub-station, the converter allows fast, real time control of the utility interconnected power line voltage or power factor.

16 Claims, 3 Drawing Sheets

$$VA = \sqrt{Q^2 + P^2}$$

DISTRIBUTED STATIC VAR COMPENSATION (DSVC) SYSTEM FOR WIND AND WATER TURBINE APPLICATIONS

BACKGROUND OF THE INVENTION

1. Field of the Invention

This invention relates to electric power-generating devices, such as wind turbines and ocean current turbines, and more particularly to an apparatus for correcting the reactive component of wind or water generated electrical power through electronic switched capacitor banks.

2. Description of the Prior Art

Wind power and tidal action in the oceans produce mechanical energy that can be captured to make electricity. Because wind and ocean energy is abundant and non-polluting, and are renewable energy sources, efforts are underway to make both wind and ocean energy economically competitive with fossil fuels and nuclear energy. Wind turbines are arrayed on land in rows where wind currents are steady, called wind farms. Tidal turbines are similar to wind turbines and would be arrayed underwater in rows, called tidal turbine farms.

Wind turbines and tidal turbines, when operating with standard induction generators, achieve output power with a lagging current with reference to the voltage. Those wind and tidal turbines with output corrected to unity will also have a lagging current with reference to the voltage at the sub-station or distribution collection point within the wind farm or tidal turbine farm. A load that tends to cause the current to become out of phase with the voltage is called a reactive load. Reactive loads are measured in Volt-Ampere Reactive units (VARs). When the current and voltage are exactly in phase this is called a unity power factor. In order to provide a power factor of unity to a utility power grid, compensation must be provided to pull the current back in phase with the voltage. This compensation must have an ability to select the number of VARs necessary to precisely compensate for the VARs introduced by the turbines and thereby bring the current and voltage in phase. The mathematical relationships between reactive power, apparent power and real power are shown by the following formulas:

Apparent Power=Volts×Amperes

True Power=Volts×Amperes×the cosine of the phase angle between volts and amps.

Reactive Power=Volts×Amperes×the sine of the phase angle between volts and amps.

Figure 5:
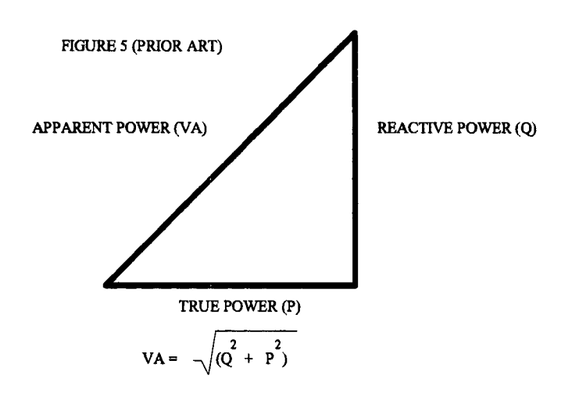

The relationships between apparent, true and reactive power are represented by a standard trigonometric function in FIG. 5.

Utilities and power producers have employed various methods of reactive power compensation for decades. These include correction through the generator at the generation source; correction through the use of synchronous condensers; correction through the use of contactor-switched capacitors; correction through Static VAR Compensators (SVC's); and correction through Static Synchronous Compensators (STATCOMS). These five methods are described below.

Correction Through the Generator at the Generation Source

Through their field exciters, synchronous generators have the ability to provide reactive power. Both automatic and manual controls are available to employ this reactive component to regulate line voltage, provide a fixed power factor or provide a fixed VAR (volt-ampere reactive) load for the distribution grid.

Induction generators, rectified synchronous generators and rectified permanent magnet generators employing solid state power electronics can also provide reactive power for line compensation.

When synchronous generators are corrected through their exciter, or when power electronics are employed with induction generators, the generators themselves must be capable of providing reactive power. This becomes a capital expense as the cost of the generator increases due to the increase in current requirements for the reactive load. Solid state power electronics costs also increase as the reactive load increases.

The response speed of these systems can be quite fast, on the order of ten's of milliseconds. They also offer excellent short-term capacity to help provide stability to the power distribution system.

Correction Through the Use of Synchronous Condensers

All synchronous machines (both motors and generators) are capable of generating reactive power. A synchronous condenser is simply a synchronous motor with its exciter tied to a control system to provide reactive power for a distribution grid. These are often modeled as generators with no prime mover, powered by the grid. As a motor they require real power or about 3% of the machines reactive-power rating. Therefore they are relatively inefficient, have a high capital cost and are expensive to operate and maintain. Despite these drawbacks, they are quite effective in maintaining line stability. Prior to the days of solid state power electronics they were quite popular as a means of reactive compensation for utility grids.

Correction Via Contactor-Switched Capacitors

A common method of reactive support is through mechanical contactor-switched capacitor banks. These are used on many wind farm applications where induction generators are used. Because the induction generator absorbs reactive power, the line voltage will drop as the output power from the wind farm increases (due to wind). Since capacitors generate reactive power without significant real-power losses or operating expense, they are attractive as compensation for induction generator systems.

Capacitor banks are usually stages in steps allowing for line voltage control as the power output of the wind farm changes. The use of contactors limits the switching times to no more then once per cycle, while the capacitors are limited in their re-connection capability due to requirements for discharge prior to re-connection. Contactor-switched capacitor banks are therefore quite slow in response to line voltage changes.

Non-wind farm applications employ both capacitors and inductors (called reactors) to allow for both absorption and generators of reactive power at the utility distribution level.

Capacitor banks do not have the ability to provide short-term generator support during fault or low line voltage conditions. They are also relatively expensive since most are designed for operation at medium and high voltage distribution levels.

Correction Through Static VAR Compensators (SVC's)

A Static VAR (volt-ampere reactive) Compensator or SVC is the name given to the combination of conventional capacitors and inductors with a fast solid state switch. Such systems can provide an automatic means of fast reactive support and line voltage control.

Passive Reactive components do not have the ability to provide short-term generation support during fault or low line voltage situations. They are also expensive since most are designed for operation at medium and high voltages distribution levels.

Correction Through Static Synchronous Compensators (STATCOMS)

The advent of fast, transistor based, power conversion electronics has allowed for the development of a system that synthesizes the reactive nature of both inductors and capacitors. These systems normally employ Pulse Width Modulated (PWM) Insulated Gate Bipolar Transistor (IGBT) inverters with DC links that allow not only power factor control but also short-term generation and substantial fault ride-through capability.

Like the SVC, these systems can provide very fast and effective distribution line voltage control. Like the SVC they are also relatively expensive.

In wind farm or tidal turbine farm applications wherein the turbine generators operate at a power factor of unity or less and do not have a method of power factor correction at the generator, there is a drop in the distribution line voltage as the power output of the farm increases due to increased wind speed or water current. Even in those turbines whose full power output is corrected to a unity power factor, a line voltage drop still occurs due to the impedance of the collector system transformers.

What is needed is a fast, real time control of the utility interconnected power line voltage or power factor in wind or water turbine applications where the turbine generators operate at a power factor of unity or less and do not have a method of power factor correction at the generator.

It is also desirable to provide a modular control system that is adaptable to different wind or water turbine generator types, sizes and groupings.

SUMMARY OF THE INVENTION

The present invention relates to a system for correcting the reactive component of wind or water generated electrical power in a power generating system. In such a system a turbine is mounted on a structure (such as a tall wind tower or a tethered underwater nacelle) that is held stationary in the horizontal axis with reference to the fluid flow.

A number of subsystem modules are provided. Each subsystem module includes a sub-system control designed to switch power factor capacitors on and off a low voltage line that is, in turn, coupled to a pad mounted transformer for connection to a medium voltage distribution system. These subsystem modules communicate with a central computer system that measures the incoming sub-station line voltage to determine the amount of capacitance necessary to hold this line voltage at its pre-determined set point. Alternately, the central computer system may be set to a pre-determined power factor instead of voltage. In this mode, the amount of capacitance is determined and selected through the same communication system as the voltage mode. A Proportional Integral Derivative controller is used to determine the necessary reactive power required. A divider is used to determine the amount of reactive power for each of the sub-systems. Communication is provided by a fiber-optic serial connection between the sub-systems and the central computer system.

The sub-system controls and central computer system operate as a standard feedback control system to regulate either line voltage or line power factor. The sub modules operate much like a fast Static VAR Compensation system except that they do not contain inductors, but capacitors only.

The invention has the advantage that by employing SCR switched power factor capacitors grouped in sub-system modules of fixed size, coupled to a central sub-station monitor system, fast, real time control of the utility interconnected power line voltage or power factor is achieved.

The invention also has the advantage that the division of the switched capacitor banks into modules of a fixed size makes them easily adaptable to different wind or water turbine generator types, sizes and groupings.

The invention also has the advantage of field placement within the wind park. Such placement of a distributed VAR correction system allows better control of the overall wind turbine or water turbine generation voltage because the correction is closer to their generators than when placed at a central sub-station. When all of the reactive control is located at the sub-station, precise control of the output voltage at the sub-station is easily achieved at the expense of a rise in voltage at the turbine due to the reactive nature of the wind turbine collector system. When located in the field, the distance between the turbines and their associated reactive compensation network is reduced, thereby providing better voltage regulation at the turbine while still achieving voltage regulation at the sub-station.

BRIEF DESCRIPTION OF THE DRAWINGS

The invention will be described in detail with reference to the drawings in which.

In these figures, similar numerals refer to similar elements in the drawings. It should be understood that the sizes of the different components in the figures may not be to scale, or in exact proportion, and are shown for visual clarity and for the purpose of explanation.

DESCRIPTION OF THE PREFERRED EMBODIMENTS

Figure 1:
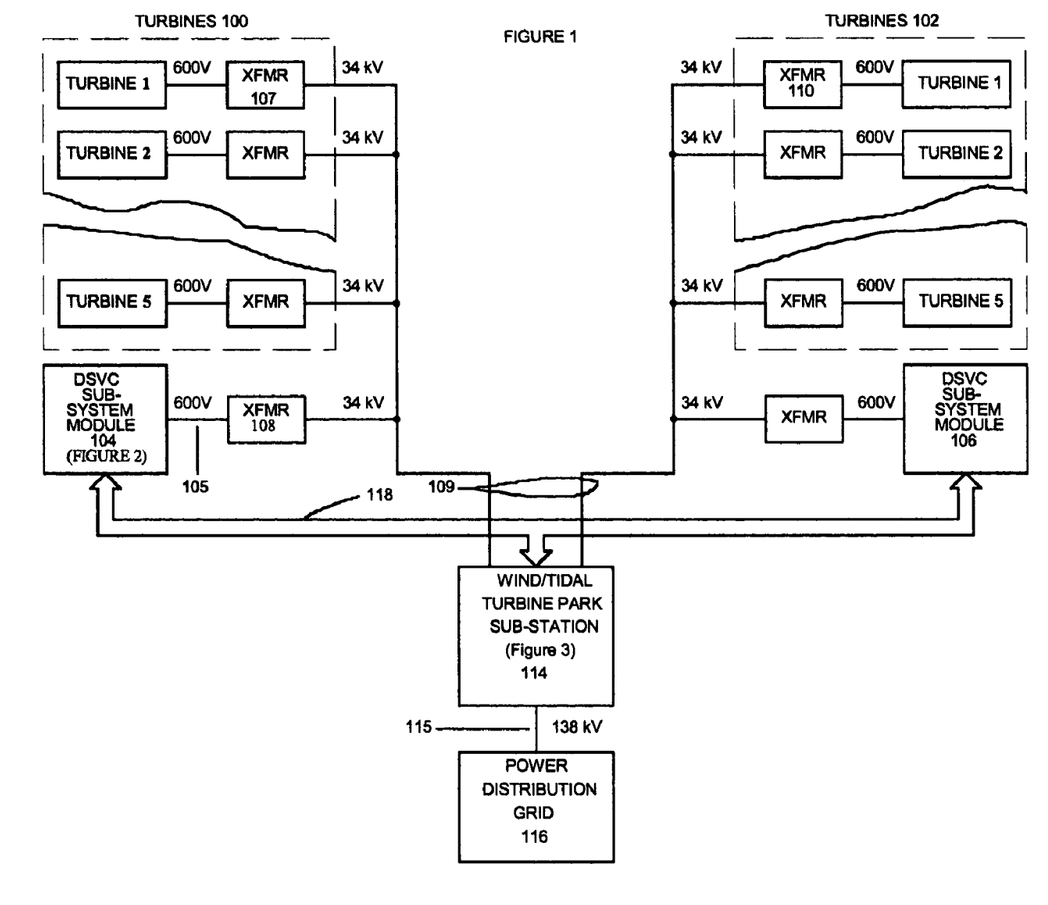
FIG. 1 is a block diagram of a system for correcting the reactive component of wind or water generated electrical power in a power generating system in which the invention is embodied.

Refer to FIG. 1, which is a block diagram of a system for correcting the reactive component of wind or water generated electrical power in a power generating system in which the invention is embodied. Wind turbines mounted on top of a tower or tidal turbines tethered underwater generate electrical power that varies with fluctuations in wind speed or water current, or the fluid flow of wind or water past the turbine blades. The turbine generators operate at a power factor of unity or less and do not have a method of power factor correction at the generator. Under these conditions there is a drop in the distribution line voltage as the power output of the turbines increases due to increased wind speed or increased water current.

Within the broken lines of logic blocks 100 and 102 are groups of wind or water turbines connected by their own transformers (XFMRS) through a medium voltage collector system to a wind park sub-station 114. Each group of turbines includes single turbines having at least one blade mounted on a rotatable shaft. Each individual turbine within the group also has a multiphase generator or generators having a stator and a rotor coupled to the rotatable shaft for rotation therewith. The generators employed for the turbines connected in 100 and 102 are induction generators that have a lagging power factor. The generators are each connected through a distribution transformer (such as XFMR 107 and XFMR 110) to the medium voltage collector system 109 that connects to the sub-station 114. Nominal voltage output of these generators is shown in FIG. 1 as 600 Volts but may be 240, 380, 480, 575 or 690 volts AC, each a standard voltage for wind turbines. The wind park utility connection, 116 is usually a high voltage of 66 kV, 138 kV, 230 kV or other standard voltage values depending upon the transmission line requirements. DSVC Sub-System modules 104 and 106 are used to correct the lagging power factor of the generators with commands received from their respective communication connections 118, which originate at the sub-station, 114, where the power distribution grid is measured by a central computer system. The central computer system measures an incoming sub-station line voltage 115 to determine the amount of capacitance necessary to either (1) hold this line voltage at a pre-determined set point or (2) hold the power factor at a pre-determined power factor set by the central computer 314 within the sub-station 114. The amount of capacitance is selected through a fiber-optic serial connection 118 between the substation 114 and the subsystem modules 104, 106.

Figure 2:
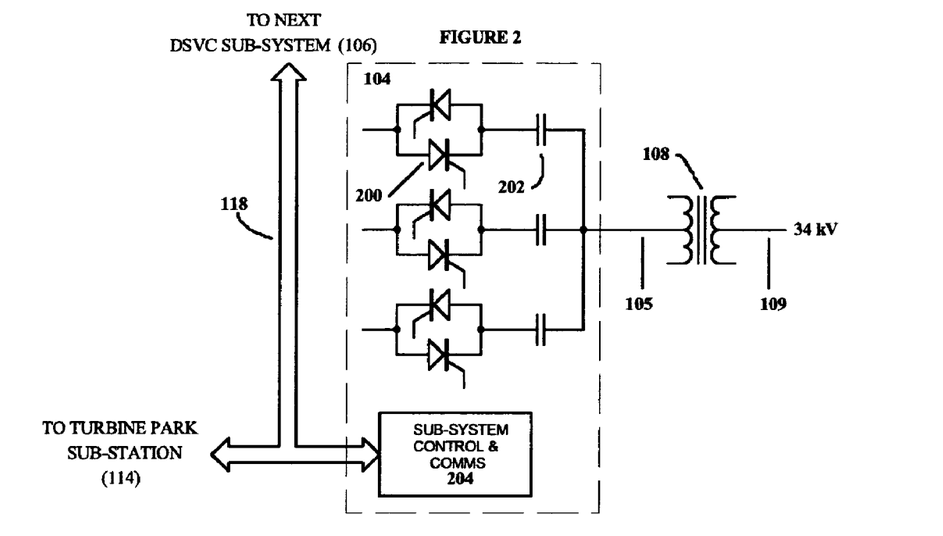
FIG. 2 is a block diagram of the Distributed Static VAR Compensation (DSVC) sub-system module shown in FIG. 1.

Refer to FIG. 2, which is a block diagram of a typical Distributed Static VAR Compensation (DSVC) sub-system module 104 shown in FIG. 1. A switched capacitor bank within the sub-system module 104 of FIG. 1 is shown in FIG. 2. The internal logic of sub-system module 106 shown in FIG. 1 is the same as sub-system module 104. The Silicon Controlled Rectifiers (SCR) are shown at 200, with a single capacitor shown at 202. Although only three banks of SCRs and capacitors are shown, typical systems have 8 to 12 banks allowing for fine selection of power factor or voltage regulation in incremental steps. The total VAR capacity of each DSCV sub-system module is determined by the collector system impedance and the reactive power output of the turbines themselves. Typical values range between 0.3 and 2.5 MVARs. The output 105 of the switched capacitor bank sub-system is applied through a pad-mounted transformer 108. The output 109 of transformer 108 is the distribution system voltage and although shown as 34 kV other voltages are workable including 12 kV, 13.2 kV, and 24 kV.

Control of the SCR switches is provided by subsystem controller 204. This subsystem controller 204 communicates with the turbine park substation 114 via a fiber optic communication system 118, which is also connected to the next DSCV subsystem 106, shown in FIG. 1. Although only two sub-system modules 104 and 106 are shown in FIG. 1, many more modules can be added to achieve the VAR level required for proper voltage or power factor regulation. A typical 100 MW wind farm, employing induction generators with 0.97 power factor would require about 25 MVAR of support to achieve unity power factor at the sub station. This would require about 10 individual 2.5 MVAR sub-system modules.

Figure 3:
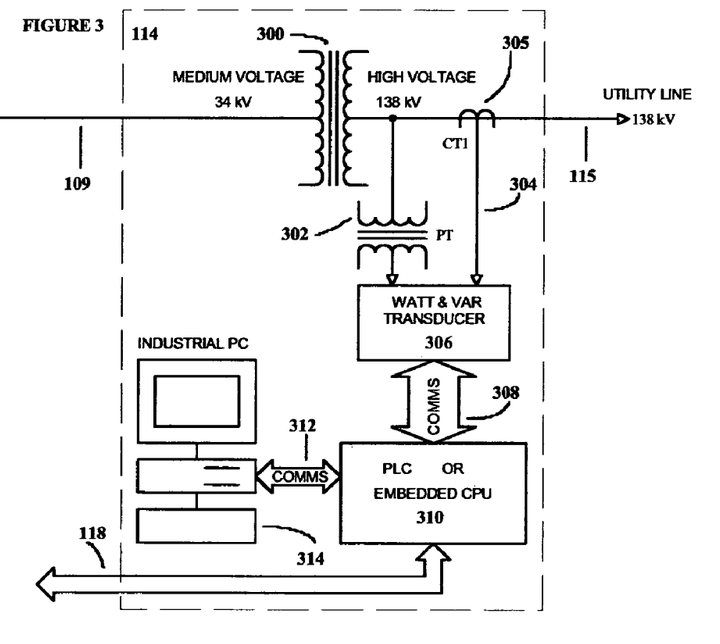
FIG. 3 is a block diagram of the wind/tidal turbine farm substation shown in FIG. 1; and, FIG. 4 is a more detailed block diagram of the watt & VAR transducer and PLC or embedded controller shown in FIG. 3; and, FIG. 5 is a diagram illustrating the relationship between apparent, true and reactive power represented by a standard trigonometric function.

The overall central control system is located inside the turbine park sub-station 114 shown in FIG. 3. For clarity, only one phase of the three-phase medium voltage collector system 109 is illustrated in FIG. 3. Although only one main power transformer is shown at 300, two or more transformers may be employed. For each main utility interface transformer 300, a single watt & VAR transducer, 306, is used to determine the overall wind/tidal farm power, reactive power, line voltage and current. The transducer 306 is connected to the utility line 115 via a transformer 302 to sense voltage value. A current transformer (CT1) 305 via a connection 304 is provided to sense current value. Only one phase is shown in FIG. 3. These values are sent to the Programmable Logic Controller (PLC) or Embedded Controller 310 over communication bus 308. The controller 310 determines the difference between the required voltage or power factor set point and the actual measured value. A user interface is provided by an industrial personal computer (PC), 314, which communicates with the controller 310 over a bus 312.

As shown in FIG. 3 the embedded controller or a Programmable Logic Controller (PLC), 310, receives the output 308 of the watt transducer 306. This data contains utility line voltage, current, power and reactive power.

Figure 4:
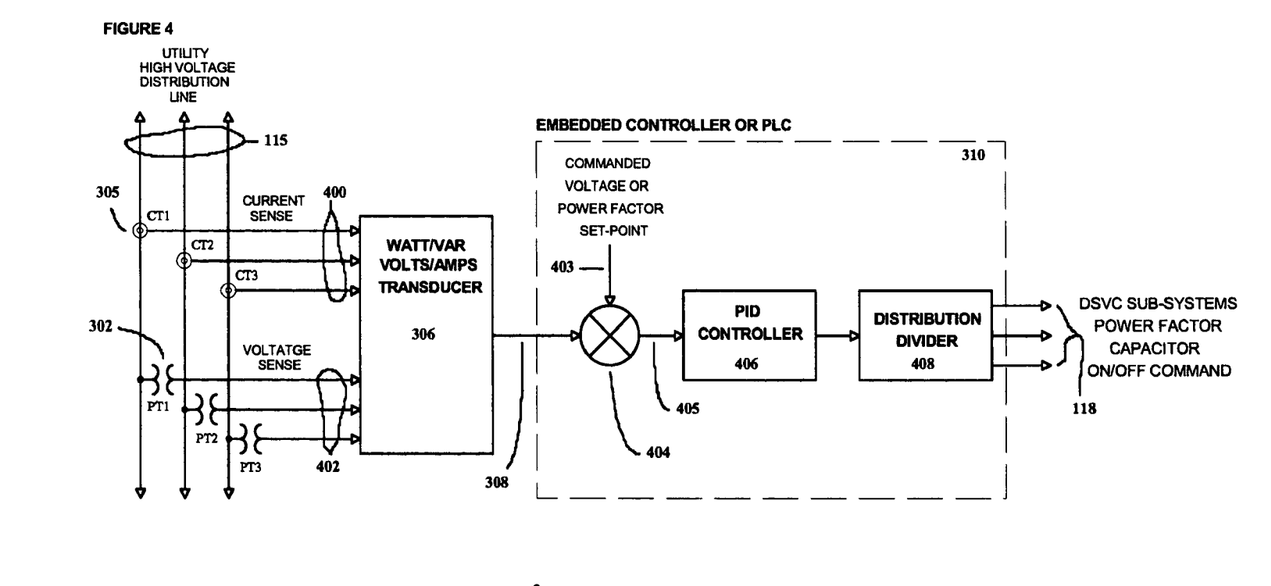

Refer to FIG. 4, which is a more detailed block diagram of the watt & VAR transducer and PLC or embedded controller shown in FIG. 3. Note that all three phases 115 of the utility high voltage distribution line are illustrated, as are all three current sense lines 400 and all three voltage sense lines 402. The PLC 310 determines the difference between the line voltage commanded 403 and the line voltage measured 308 through an error amplifier 404. The error output 405 is applied to a Proportional, Integral, Derivative (PID) real-time control controller 406 for determination of the necessary reactive power required to keep the line voltage or power factor within its commanded set point. This value is then sent to a distribution divider, 408 which simply divides the VAR requirement by the number of sub-systems to obtain the VAR requirement at each sub-system module. The sub-system controller 204 within the sub-system module 104 determines the number of capacitors that are needed to achieve the required VAR level for sub-system module 104. Similarly, a sub-system controller within the sub-system module 106 determines the number of capacitors that are needed to achieve the required VAR level for sub-system module 106.

This automatic control system maintains the line voltage or power factor by direct measurement of those values through the transducer, 306 and its associated current sensors CT1, CT2 and CT3 and potential transformers PT1, PT2 and PT3. Real time data display and modification of the set point is available through the industrial PC interface, 314, in FIG. 3.

SUMMARY

A voltage or power factor method and apparatus has been described with reference to a wind or current power generating system for providing power to a power distribution grid 116. A substation 114 includes a central computer connected to the power distribution grid for determining a difference between a required voltage or power factor set point and an actual measured value of voltage or power factor. Groups of generators are connected to a medium voltage collector system 109 and to the sub-station 114. DSVC Sub-System modules 104 and 106 include power factor correction means connected to the medium voltage collector system 109 to correct a lagging power factor of the generators in response to commands received from the sub-station 114. The central computer includes means for measuring line voltage 115 on the power distribution grid 116 to determine an amount of capacitance necessary to either (1) hold the line voltage at a pre-determined set point or (2) hold the power factor at a pre-determined power factor set by the central computer.

In this embodiment, the system becomes a Distributed Static VAR Compensation system or DSVC. It operates similarly to the conventional SVC systems described above, but does not employ inductors. This system is designed to operate with inductive type generator system used on utility grade wind or water turbines. These generators along with their associated transformers are highly inductive and require capacitors to correct their power factor and to help maintain the line voltage at a nominal required value.

The distributed nature of the sub-system modules allows a manufacturer to assemble the same size equipment regardless of the wind farm size. As the size of the wind farm increases, more modules can be added to assure a proper level of reactive power to maintain line voltage or power factor at the selected value.

The distributed nature of the sub-system modules allows the developer and farm construction engineers to install the sub-system modules at either the sub-station or within the farm itself. Since the output of the sub-system modules is connected to the farm's distribution system in the same fashion as the individual wind turbines, sub-system modules may be installed in the field next to a group of wind turbines. Installation in this fashion can be easier then direct installation at the sub-station due to the nature of sub-station construction, and its requirements.

The advantage of the distributed system is further enhanced when applied to turbines used in wind farm applications that maintain a unity power factor. The DSVC system will therefore need only one or two sub-systems to correct the effects of line and transformer reactance. In either case, turbines with unity power factor, or turbines with less then unity power factor, the DSVC can directly control the line voltage and power factor at the utility interconnection point of the wind farm. This leads to greater line stability and allows for higher levels of generation within the utility system than what would be allowed with a non-unity power factor output.

Other advantages of the distributed approach to this type of power factor correction is the ability of the field mounted DSVC system to help maintain line voltage regulation at both the power distribution grid and at the turbines themselves. If all of the correction is located within the sub-station then the correction may cause the voltage at the turbines to rise to unacceptable levels while correcting the line to within its required parameters. When located in the field, this correction keeps the turbines within their voltage limits, yet still corrects the line voltage to an acceptable value.

While the invention has been particularly shown and described with reference to preferred embodiments thereof, it will be understood by those skilled in the art that the foregoing and other changes in form and detail may be made therein without departing from the scope of the invention.

The invention claimed is:

1. A system for correcting the reactive component of generated electrical power in a fluid-flow power generating system comprising:

A power distribution grid;

A plurality of turbines;

Each turbine comprised of a turbine rotor having at least one blade mounted on a rotatable shaft and a multiphase induction generator having a stator and a rotor coupled to said rotatable shaft for rotation therewith in response to said fluid flow;

a substation including a central computer connected to said power distribution grid that determines the difference between a required voltage or power factor set point and an actual measured value;

a medium voltage collector system connected to groups of generators to said sub-station;

One or more sub-system modules including power factor correction logic connected to said medium voltage collector system that corrects a lagging power factor of said generators in response to commands received from said sub-station central computer;

Said central computer system including logic that measures line voltage on said power distribution grid to determine and output to a sub-system module a set point command necessary to either (1) hold a line voltage on said incoming high-voltage distribution line at a predetermined set point or (2) hold a power factor of said incoming high-voltage distribution line at a predetermined power factor set point.

2. A system for correcting the reactive component of generated electrical power in a fluid-flow power generating system comprising:
   A plurality of turbines;
   Each turbine comprised of a turbine rotor having at least one blade mounted on a rotatable shaft and a multiphase induction generator having a stator and a rotor coupled to said rotatable shaft for rotation therewith in response to said fluid flow;
   A turbine park electrical distribution system;
   Each multiphase induction generator connected to said turbine park electrical distribution system through step-up transformers;
   One or more sub-system modules, each connected to said turbine park electrical distribution system through step-up transformers;
   An incoming high-voltage distribution line from a power distribution grid:
   Each of said sub-system modules including a sub-system controller capable of switching power factor capacitors on and off of said electrical distribution system;
   a central computer system within a sub-station serving said plurality of turbines;
   Each sub-system controller being connected to said central computer system;
   said incoming high-voltage distribution line being connected to said sub-station;
   Said central computer system including logic that measures said incoming high-voltage distribution line to determine and output a set point command necessary to either (1) hold a line voltage on said incoming high-voltage distribution line at a predetermined set point or (2) hold a power factor of said incoming high-voltage distribution line at a predetermined power factor set point;
   a transducer connected to said high-voltage distribution line to sense at least one of voltage value and current value;
   A controller; and,
   An error amplifier having a first input connected to said transducer, a second input connected to said computer system to receive said set point command and an error amplifier output connected to said controller, said error amplifier output being a value that is the difference between a VAR from said controller and an actual measured value of VAR on said transducer output.

3. The combination in accordance with claim 2 wherein said error output is applied to a Proportional Integral Derivative (PID) real-time control system for determination of the necessary reactive power required to keep the line voltage or power factor within said set point commanded by said computer system; and
   A distribution divider connected to said PID, an output of said PID being the VAR level required from each sub-system module, such that a sub-system controller within a sub-system module is enabled to determine the number of capacitors necessary to achieve said required VAR level.

4. A system for correcting a reactive component of generated electrical power in a power generating system comprising:
   a power distribution grid;
   a medium voltage collector system;
   a number of electrical power generators connected to said medium voltage collector system;
   a number of subsystem modules connected to said medium voltage collector system;
   a substation connected to said medium voltage collection system;
   said substation including a central computer connected to said power distribution grid;
   each subsystem module including a sub-system control including power factor capacitors and logic to switch said power factor capacitors on and off said medium voltage collector system for correcting a lagging power factor of said generators in response to commands received from said sub-station central computer;
   said central computer system including logic that measures said high-voltage distribution line to determine an amount of capacitance necessary to either (1) hold incoming line voltage on said high-voltage distribution line at a predetermined set point or (2) hold a power factor of said high-voltage distribution line at a predetermined power factor set by said central computer, resulting in a commanded voltage or power factor set point command output from said central computer to said sub-system control.

5. A system for correcting a reactive component of generated electrical power in a power generating system comprising:
   high-voltage distribution line;
   a medium voltage collector system;
   a number of electrical power generators connected to said medium voltage collector system;
   a number of subsystem modules connected to said medium voltage collector system;
   each subsystem module including a sub-system control including power factor capacitors and logic to switch said power factor capacitors on and off a low voltage line that is coupled through a transformer to said medium voltage collector system;
   a central computer system connected to said number of subsystem modules;
   said central computer system including logic that measures said high-voltage distribution line to determine an amount of capacitance necessary to either (1) hold incoming line voltage on said high-voltage distribution line at a predetermined set point or (2) hold a power factor of said high-voltage distribution line at a predetermined power factor set by said central computer, resulting in a commanded voltage or power factor set point command output from said central computer;
   a transducer connected to said high-voltage distribution line to sense at least one of voltage value and current value; and,
   an embedded controller or PLC connected to said transducer;
   said embedded controller or PLC including an error amplifier having a first input connected to said transducer, a second input connected to said commanded voltage or power factor set point command output from said central computer and an error output connected to a Proportional Integral Derivative PID controller, a PID output of said PID controller being a value that is the difference between said commanded voltage or power factor set point command output from said central computer and an actual measured value of VAR on said transducer output.

6. The combination in accordance with claim 5 wherein said error output is applied to a Proportional Integral Derivative (PID) real-time control system for determination of the necessary reactive power required to keep the line voltage or power factor within a said set point commanded by said central computer; and a distribution divider having an input connected to said PID controller and an on/off command output connected to each of said number of subsystem modules, said on/off command output of said distribution divider being said PID output divided by the number of said subsystem modules.

7. A power generating system comprising:

A power distribution grid;

A substation including a central computer connected to said power distribution grid for determining the difference between a required voltage or power factor set point and an actual measured value;

A medium voltage collector system;

Means for connecting groups of generators to said medium voltage collection system and to said sub-station; and, Power factor correction means connected to said medium voltage collector system for correcting a lagging power factor of said generators in response to commands received from said sub-station;

Said central computer including means for measuring line voltage on said power distribution grid to determine an amount of VAR necessary to either (1) hold said line voltage at a predetermined set point or (2) hold the power factor at a predetermined power factor set by said central computer.

8. The power generating system in accordance with claim 7 wherein said sub-station further includes:

Sensing means for sensing at least one of voltage value and current value by a transducer connected to said power distribution grid; and, An error output means, said error output means providing a value that is the difference between a predetermined VAR and an actual measured value of VAR on said transducer.

9. The power generating system in accordance with claim 8 further comprising:

Means for determining a required VAR level needed to keep said line voltage within said predetermined set point or said power factor within said predetermined power factor; and, Means for supplying reactive power necessary to achieve said required VAR level.

10. A method of correcting a reactive component of generated electrical power in a power generating system comprising steps of:

A. coupling one or more electrical power generators to a medium voltage collector system that is connected through a substation to a high-voltage distribution line;

B. coupling one or more subsystem modules containing a number of power factor capacitors over a low voltage line to said medium voltage collector system;

C. measuring said high-voltage distribution line to determine an amount of VAR necessary to either (1) hold voltage on said high-voltage distribution line at a predetermined set point or (2) hold a power factor of said high-voltage distribution line at a predetermined power factor; and, D. selectively switching a said number of power factor capacitors on and off said low voltage line to thereby hold said voltage on said high-voltage distribution line at one of (1) a predetermined voltage set point or (2) a predetermined power factor set point.

11. The method in accordance with claim 10 wherein said step C further includes steps of:

E. sensing at least one of a voltage value and a current value by a transducer connected to said high-voltage distribution line; and, F. producing, subsequent to said sensing step E, an error output, said error output being a value that is the difference between a predetermined VAR and an actual measured value of VAR on said transducer output.

12. The method in accordance with claim 11 comprising the further steps of:

G. determining a reactive power required VAR level to keep said line voltage within said predetermined set point or said power factor within said predetermined power factor set point; and, H. supplying to said medium voltage collector system, a reactive power necessary to achieve said required VAR level.

13. The combination in accordance with claim 1 wherein said sub-station includes:

a transducer connected to said high-voltage distribution line to sense at least one of voltage value and current value;

a controller; and, an error amplifier having a first input connected to said transducer, a second input connected to said computer system to receive said set point command and an error amplifier output connected to said controller, said error amplifier output being a value that is the difference between a VAR from said controller and an actual measured value of VAR on said transducer output.

14. The combination in accordance with claim 13 wherein said error output is applied to a Proportional Integral Derivative (PID) real-time control system for determination of the necessary reactive power required to keep the line voltage or power factor within said set point commanded by said computer system; and A distribution divider connected to said PID, an output of said PID being the VAR level required from each sub-system module, such that a sub-system controller within a sub-system module is enabled to determine the number of capacitors necessary to achieve said required VAR level.

15. The combination in accordance with claim 4 further comprising:

a transducer connected to said high-voltage distribution line to sense at least one of voltage value and current value; and, an embedded controller or PLC connected to said transducer;

said embedded controller or PLC including an error amplifier having a first input connected to said transducer, a second input connected to said commanded voltage or power factor set point command output from said central computer and an error output connected to a Proportional Integral Derivative PID controller, a PID output of said PID controller being a value that is the difference between said commanded voltage or power factor set point command output from said central computer and an actual measured value of VAR on said transducer output.

16. The combination in accordance with claim 15 wherein said error output is applied to a Proportional Integral Derivative (PID) real-time control system for determination of the necessary reactive power required to keep the line voltage or power factor within said set point commanded by said central computer; and a distribution divider having an input connected to said PID controller and an on/off command output connected to each of said number of subsystem modules, said on/off command output of said distribution divider being said PID output divided by the number of said subsystem modules.

* * * * *